Dec. 14, 1965  S. SASLAWSKY ETAL  3,222,717
BLOW MOLDING SYSTEM
Filed March 16, 1962  3 Sheets-Sheet 1

INVENTORS.
SHELDON SASLAWSKY
RICHARD P. HYLAND
BY
ATTORNEY.

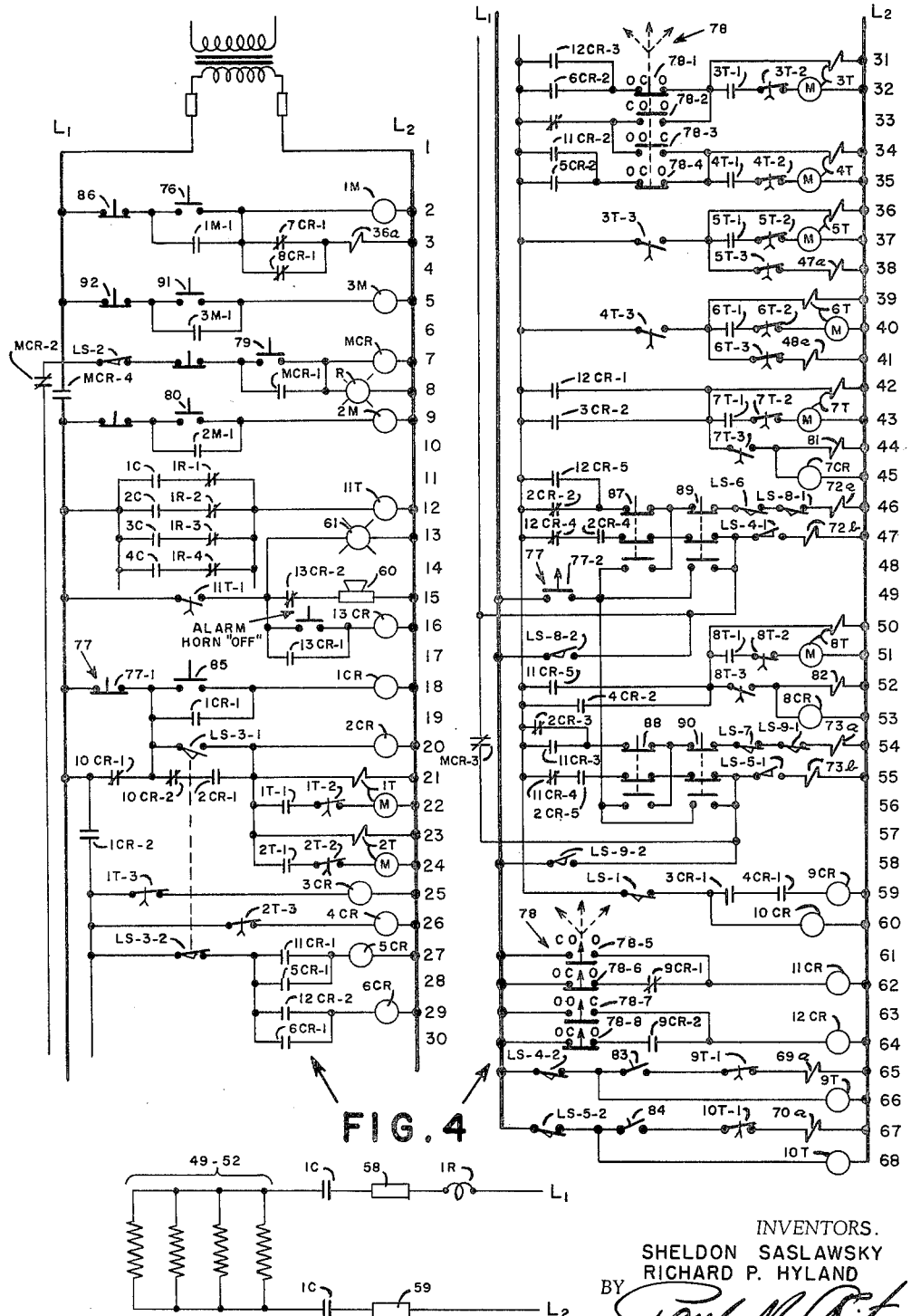

3,222,717
BLOW MOLDING SYSTEM
Sheldon Saslawsky, Bridgeport, Conn., and Richard P. Hyland, East Walpole, Mass., assignors to The Producto Machine Company, Bridgeport, Conn., a corporation of Connecticut
Filed Mar. 16, 1962, Ser. No. 180,273
6 Claims. (Cl. 18—5)

The present invention relates to blow molding of plastics, and particularly to a new and improved blow molding apparatus system and sequence control therefor.

The principal object of the invention is to provide a blow molding system and sequence control therefor that will provide a high rate of production of plastic articles.

Another object of the invention is to provide such a system in which a plurality of sets of dies are supplied with plasticized parisons which are formed into plastic articles in a manner such that a substantially continuous flow of plastic articles is produced.

Still another object of the invention is to provide such a system and control therefor in which the production of articles by separate sets of dies between separate platens is timed so that while those articles in one set are being formed, those of another set have been formed and are ejected from the corresponding dies.

Another object of the invention is to provide such a system and control therefor in which the alternate finishing of articles is occasioned while using a continuously feeding extruder.

Still another object of the invention is to provide such a system and control therefor in which the heating zones throughout the apparatus may be quickly and easily checked for operational failures.

Another object of the invention is to provide such a system and control therefor in which identical cycles of operation may be produced in staggered relation for each of the sets of platens employed.

Still another object of the invention is to provide such a system and control therefor in which two sets of platens are employed, and either both or only one or the other may be utilized to effect production.

In one aspect of the invention, two presses may be so arranged relative to each other that the split dies for each are mounted on separate pairs of reciprocable platens, and plasticized parisons are capable of being fed between the pairs of reciprocable platens from a common source that embodies a continuously operable feeding means.

In another aspect of the invention, the presses may include a linkage between their respective platens such that a hydraulic cylinder and piston device at one end of each press moves both platens thereof an equal amount toward or from each other simultaneously. In this way, the presses may be arranged with opposed ends in substantially abutting relationship, and a minimum of space is consumed with the piston and cylinder devices at opposed ends thereof.

In still another aspect of the invention, an extruder which may be continuously operated during production, may have its discharge end arranged to feed the plasticized plastic between a horizontally disposed accumulator and a manifold leading to separate extrusion head means above the respective sets of reciprocable platens.

In a further aspect of the invention, valve means may be provided ahead of each of the extrusion head means for interrupting the flow of the semifluid plastic to said heads. In this way, the closing of said valves causes the plasticized plastic to pass into the accumulator, thereby permitting the continuous operation of the extruder.

In another aspect of the invention, appropriate heating elements may be provided at appropriate zones throughout the system to render the granular plastic semifluid, and to maintain it semifluid throughout the production cycle. The heating elements for each zone may be provided with a unique detecting arrangement for isolating any zone in which failure of some of the heating elements may occur, and for doing this in ample time to permit correction of the failure prior to the freezing of the semifluid plastic within that zone.

In still another aspect of the invention, each extrusion head may be provided with an air line along its axial centerline, and appropriate solenoid valves may be provided to control the blow molding operation as well as cooling of the molded product.

In another aspect of the invention, separate fluid-operated, mechanical ejector devices may be provided for each set of extrusion heads for ejecting the finished product after it has been formed and when its corresponding split dies are open.

In a still further aspect of the invention, an electrical control system may be provided for causing said apparatus to produce separate, identical cycles of operation for each of the sets of dies between the separate pairs of platens.

In still another aspect of the invention, the control system may be arranged such that prior to the initiation of a production run, parisons are extruded between the open sets of dies of the separate pairs of platens and both sets of platens are then closed. The valve means ahead of the extrusion heads are closed, causing the plasticized plastic to flow into the accumulator. Next, air is turned off in the first extrusion head means and turned on in the second, the air remaining off in the first extrusion head means while remaining on in the second extrusion head means. This occurs only in the initial cycle in order to properly sequence the system.

At the beginning of the second or first complete repetitive cycle, the first platens open while the second remain closed. Next, the valve means for the first extrusion head means opens, and substantially simultaneously the ejector device for the first set of die means is caused to operate. Accordingly, a new parison is extruded between the open die means of the first platen while the corresponding valve means and ejector means for the second set of die means remain ineffective, i.e., the fluid valve for the second extrusion head remains closed. Next, the first platens close while the second platens remain closed. Next, the valve means for the first platen extrusion head means closes while that for the second remains closed, causing the plasticized plastic to flow to the accumulator. The air for the first extrusion head means is then turned on while that for the second remains on. Finally, the air is turned off for the second extrusion head means while remaining on for the first.

The next succeeding cycle begins with the second platen means opening while the first remains closed. Then, the valve means ahead of the second extrusion head means opens, extruding a new parison between the dies of the second platens, while the valve ahead of the first extrusion head means remains closed. Substantially simultaneously with the opening of the valve means for the second extrusion head means, the ejector for the second platens is operated while that of the first is not. The next step closes the second platens while the first remain closed. Next, the valve means for the second extrusion head means closes while that of the first remains closed. Next, the air for both extrusion head means is turned on, and finally the air for the first extrusion head means is turned off while that for the second remains on.

From the foregoing it is evident that each cycle of operations within a production run involves seven steps and that the first, second, third and seventh steps alternate within each succeeding cycle.

In still another aspect of the invention, the sequence control circuit may include an arrangement for utilizing only the one set of dies and platens so that should difficulties arise with one set, production can be maintained during repair of the "down" side of the apparatus.

The above, other objects and novel features of the invention will become apparent from the following specification and accompanying drawings which are merely exemplary.

In the drawings:

FIG. 3 is a wiring diagram of the heater arrangements that are located at various zones of the apparatus shown in FIGS. 1 and 2; and FIG. 4 is a wiring diagram of the electrical control circuit for the apparatus shown in FIGS. 1 and 2.

Figure 1:
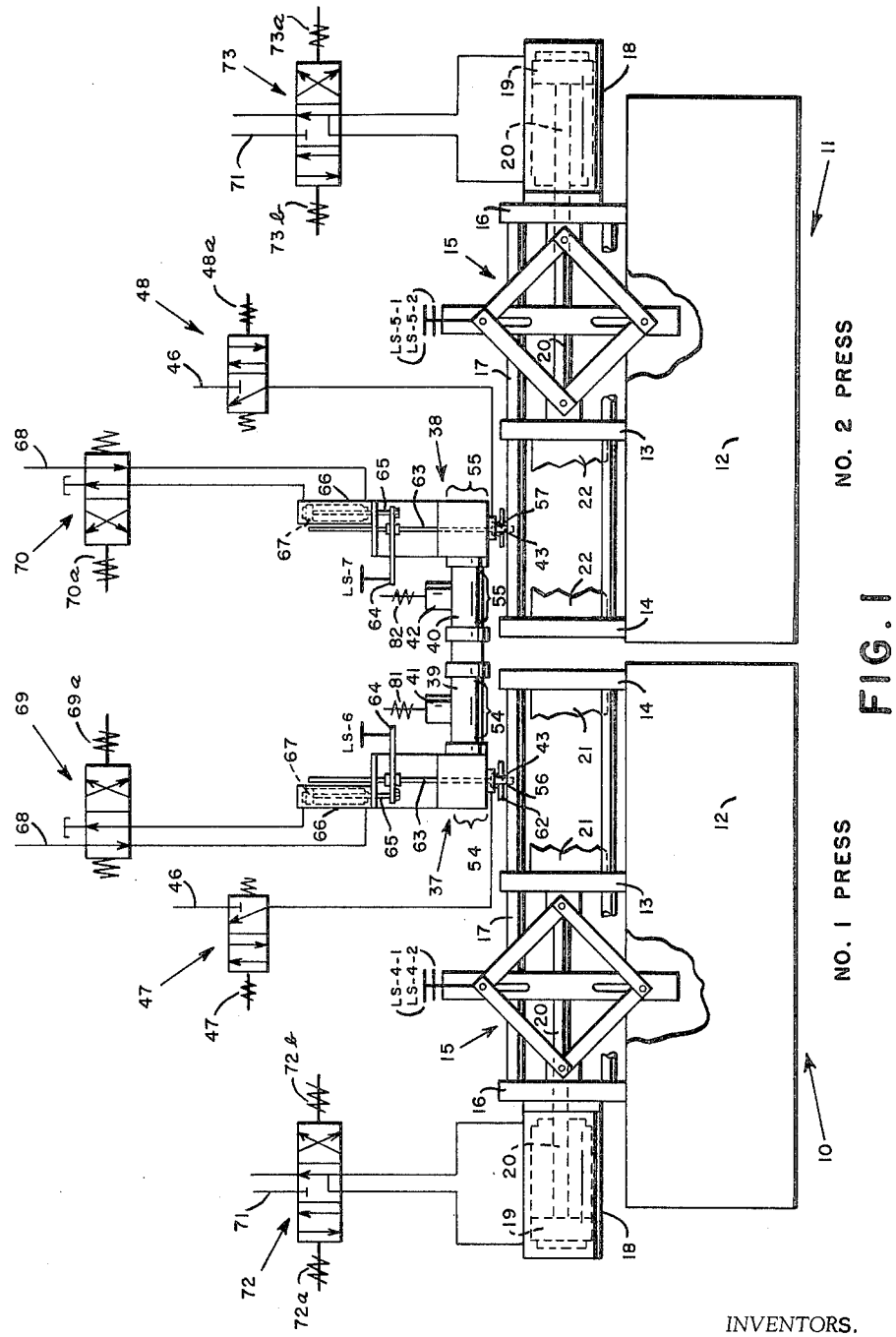
FIG. 1 is a front elevational view of a blow molding system to which the principles of the invention have been applied.
Figure 2:
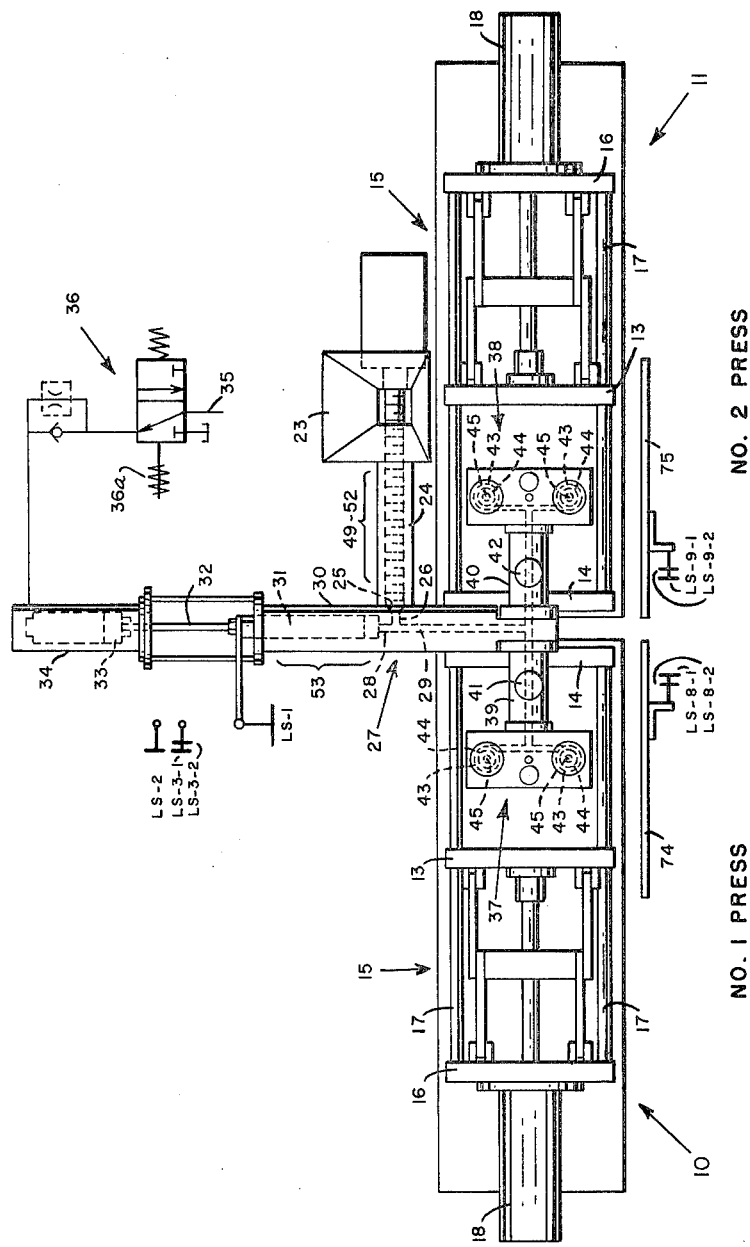
FIG. 2 is a top plan view of the apparatus shown in FIG. 1.

Referring to the drawings and particularly to FIGS. 1 and 2, the principles of the invention are shown as applied to apparatus including identical presses 10 and 11 that are arranged in slightly spaced, longitudinally aligned but opposed relation.

Each press may comprise a base 12 on which platens 13 and 14 may be mounted for reciprocable movement. The platen 13 may be connected through linkage 15 to a rear plate 16 that is also mounted for reciprocation on base 12. The plate 16 is rigidly connected to the platen 14 by bars 17 that slidingly pass through platen 13. The rear plate 16 may be connected to a cylinder 18 within which a piston 19 reciprocates. The piston 19 is connected to platen 13 through piston rod 20. The construction and arrangement of the parts are such that every incremental movement of cylinder 18, plate 16 and platen 14 is accompanied by a corresponding incremental movement of the piston 19 and platen 13 in an opposite direction.

The presses are identical and are similar to that shown, described and claimed in U.S. patent application Serial No. 90,676, filed February 21, 1961, in the names of Albert E. Calchera and Frank J. Bucci, now Patent No. 3,103,701, issued September 17, 1963, to which reference is directed for specific details of construction.

Dies 21 and 22 may be located between the platens 13 and 14 of each press, and these dies may be identical or different. Since each press is identical, the one on the left (FIG. 1) will be referred to as the No. 1 or first press, while that on the right will be referred to as the No. 2 or second press.

Referring to FIG. 2, a bin 23 may be arranged to feed granular polyethylene or similar plastic material to a screw conveyor 24, the discharge end 25 thereof being connected to a duct 26 leading to a passage 27 that includes portions 28 and 29 that extend at right angles to duct 26. The portion 28 may lead to an accumulator cylinder 30 having a piston 31 therein that is connected through a rod 32 to a piston 33 within a cylinder 34. The cylinder is adapted to be supplied with pressure fluid from a source line 35 under conditions to be described later through the selected action of a solenoid-operated valve 36.

The portion 29 of passage 27 may lead to manifolds 37 and 38 for the No. 1 and No. 2 presses, respectively, through ducts 39 and 40. Solenoid-operated gate valves 41 and 42 may be located in each of the ducts 39 and 40 for interrupting the flow of plasticized plastic through the ducts 39 and 40.

The manifolds 37 and 38 may be located above and between the platens for the No. 1 and No. 2 presses. In the embodiment disclosed, each manifold 37, 38 is shown as supporting two extrusion head nozzles 43, each including an annular chamber 44 into which is fed the plasticized plastic from the ducts 39 and 40. Additionally, the extrusion nozzle 43 for the No. 1 press may include an air jet nozzle 45 located centrally thereof and adapted to be supplied with air from a source line 46 through the action of a solenoid valve 47. The air jet nozzle 45 for the extrusion nozzle for the No. 2 press may be controlled by the selective actuation of a solenoid valve 48. As the plasticized plastic is forced downwardly through the extrusion nozzles 43 between the open platens 13, 14, it takes the form of a tubular parison. Upon closing of the platens, the dies 21 enclose the tubular parison, after which the supplying of air through the nozzle 43 blows the parison outwardly into intimate contact with the inner walls of the dies 21.

In order to convert the granular form of the plastic in bin 23 into a semifluid, homogeneous mass, and to maintain said mass semifluid until it is acted upon by the air while the parison is within the dies 22, heating zones may be provded at various points throughout the system from the extruder screw housing to the discharge end of the nozzles 43. Thus, several such zones 49–52 may be provided along the housing of the screw conveyor 24 where it is necessary initially to plasticize the granular plastic. Each of the zones may include a plurality of resistance heating elements in parallel with a source of voltage. Another zone of heaters 53 may be provided along the accumulator 30. Still other zones 54 and 55 may surround the duct 39 and manifold 37; and the duct 40 and manifold 38, respectively. Still other zones 56 and 57 may surround the extrusion nozzles 43, 43. Since each zone may include a plurality of heater resistances in parallel, it becomes a sizable job to quickly locate a zone in which some of the heater resistances burn out. Should any zone have enough heater resistances that stop functioning, the plasticized plastic will freeze, causing damage to the system due to the increase in pressure required to force the plastic along its paths of travel.

In the text that follows, numerals in parentheses will designate the line on FIG. 4 at which the referenced electrical component is located.

In order to avoid the aforementioned difficulties, a unique arrangement of the resistance heaters is provided. Referring to FIG. 3, each heating zone may comprise a plurality of resistance heaters in parallel, and in FIG. 3 four such heaters are shown. Each circuit with its parallel connected heater resistors may be controlled by a temperature controller including normally open contacts 1C in both lines $L_1$ and $L_2$. Fuses 58, 59 are included in lines $L_1$ and $L_2$, and a coilless relay IR may be included in line $L_1$. The relay IR may have the line $L_1$ coiled around its armature a sufficient number of turns such that the field developed by virtue of the normally required current flow to operate the heater resistors in parallel will operate the relay armature to hold normally closed contacts IR–1 of FIG. 4 open.

The temperature controller may include a visual indicator, and fuctions to effect closing of contacts 1C when the temperature of the zone is below the required value, and to open contacts 1C when the temperature is slightly higher than the required temperature. However, should a certain number of the heater resistors cease to function so that the temperature of the zone continues to fall, contacts 1C close and the current drawn through relay IR is insufficient to maintain it energized, causing it to drop out, closing contacts IR–1 (FIG. 4), thereby energizing time delay relay 11T (12), which after a second closes contacts 11T–1 (15) to energize a horn 60 (15) and light a warning light 61. The one-second time delay for closing contacts 11T–1 is sufficient to effect opening of contacts IR–1 when, under normal conditions, contacts 1C close upon the demand for additional heating. The attendant then, by observing the visual indicators of the temperature controllers for all of the heating zones, can immediately isolate the faulty zone and restore it to service before the plasticized plastic freezes within that zone.

Referring again to FIG. 1, means may be provided on each manifold 37 and 38 for ejecting the finished article after the platens have been opened. The ejecting means for the No. 1 press may comprise an abutment member 62 that is connected to a rod 63 having an arm 64 attached thereto. The arm 64 may be connected to a rod 65 that extends into a cylinder 66 and has fixed to one of its ends, a piston 67 that reciprocates within cylinder 66. Pressure liquid may be selectively supplied to opposite ends of cylinder 66 from a supply source line 68 through the selected operation of a solenoid valve 69. The ejector means for the No. 2 press may be identical with that for the No. 1 press and it may be controlled by the selective actuation of a solenoid valve 70. The cylinder 18 for the platens 13, 14 for the No. 1 press may be supplied with pressure liquid selectively at each end thereof from a source line 71 through the selective actuation of a solenoid valve 72. The cylinder 18 for the No. 2 press may be supplied with pressure liquid in the same manner, but controlled by the selective actuation of a solenoid valve 73.

In order to cause the system to produce the desired cycle of operation, certain limit switches are employed. Thus, a limit switch LS–1 is actuated when the accumulator piston 31 is in its forwardmost position, i.e., when the accumulator cylinder is substantially empty. Another limit switch LS–3 is actuated when the accumulator piston 31 is in its rear position; and still another limit switch LS–2 is actuated as a safety device if the piston 31 moves rearwardly beyond switch LS–3.

When the platens 13, 14 for the No. 1 press are open, a limit switch LS–4 is actuated, and a switch LS–5 is actuated when platens 13, 14 of the No. 2 press are in open position. Additionally, limit switches LS–6 and LS–7 will be actuated when the ejector mechanisms of the No. 1 and No. 2 presses are in their upper retracted positions. Finally, safety limit switches LS–8 and LS–9 are actuated when the safety gates 74 and 75 are closed, preventing access to the dies 21 and 22 between the platens.

Referring to FIG. 4, an electrical wiring diagram is disclosed which will automatically cause the apparatus to produce the desired cycle of operations. It will be explained by describing a selected cycle of operations of the apparatus. As previously stated, reference to the various electrical symbols will be accompanied by numerals in parentheses which will refer to the horizontal lines of FIG. 4 on which the symbol is located.

With the apparatus in the condition shown in the drawings, pressing the hydraulic start pushbutton 76 energizes motor starter 1M (2) which closes 1M–1 contacts (3), holding the motor energized after release of button 76. Normally closed contacts 7CR–1 and 8CR–1 (3, 4) energize solenoid 36a, admitting pressure liquid to cylinder 34 which forces piston 31 to its forward position, closing LS–1 contacts (59).

The "Auto-Jog" switch 77 (18, 49) is moved to the "Auto" position, closing contacts 77–1 (18) and opening contacts 77–2 (49). A platen selector switch 78 (32–35; 61–64) may have three positions. In its central solid-line position as shown in FIG. 4, contacts 78–1 are closed; contacts 78–2 are open; contacts 78–3 are open; contacts 78–4 are closed; and contacts 78–5 are open; 78–6 closed; 78–7 open and 78–8 closed. When switch 78 is moved to the left, the No. 1 press platens only are operable, and contacts 78–1 are open; 78–2 are closed; 78–3 are open; 78–4 are open; and contacts 78–5 are closed; 78–6 are open; 78–7 open and 78–8 open. When switch 78 is turned to the right, the No. 2 press platens only are operable, and contacts 78–1 are open; 78–2 are open; 78–3 are closed and 78–4 open; and 78–5 are open; 78–6 open; 78–7 closed and 78–8 open.

With the platen selector switch 78 (31–35) in the central solid-line position, pressing the "Power On" pushbutton switch 79 (7) energizes the MCR relay (7) which closes contacts MCR–1 (8), holding MCR relay energized after release of switch 79. This action lights an indicating light R (8). Energizing the MCR relay also opens contacts MCR–2 and closes contacts MCR–4 (8), and opens MCR–3 (54) conditioning the circuit for automatic cycle operation.

Pressing the extruder motor start button 80 energizes the starting coil 2M (9), closing 2M–1 holding contacts (10). Accordingly, the extruder begins to force parisons from the extrusion nozzles 43, and the apparatus is in the following condition:

With the MCR–4 contacts (8) closed and with gates 74 and 75 closed and platens 13, 14 closed, LS–8–2 (51) and LS–9–2 (58) as well as LS–4–1 (47) and LS–5–1 (55) will be closed, so that solenoids 72b (47) and 73b (55) of valves 72, 73 (FIG. 1) are energized, causing platens 13 and 14 for both presses to open until LS–4–1 (47) and LS–5–1 (55) open, causing said platens to remain open. Since at this point (prior to starting a cycle) relay 1CR (18) is not energized, contacts 1CR–2 (23) are open and 3CR relay (25) as well as 4CR relay (26) are de-energized. Accordingly, solenoids 81 (44) and 82 (52; see also FIG. 1) are de-energized and gate valves 41 and 42 are open, causing parisons to be formed from nozzles 43 between the open platens 13, 14 for each press.

When, as previously described, LS–4–1 (47) and LS–5–1 (55) were opened to hold platens 13, 14 open, LS–4–2 (65) and LS–5–2 (67) closed. Since, as explained, the cycle has not yet been started and, as previously described, 1CR relay (18) is de-energized and 1CR–2 contacts (23) are open, therefore, solenoids 47a (38) and 48a (41) of valves 47 and 48 (FIG. 1) are de-energized and air under pressure does not issue from nozzles 45 (FIG. 1). Since as previously described, the valves 41 and 42 are open, the accumulator 30 is empty; piston 31 is forward; and LS–1 (59) is closed.

The above-described presetting of the apparatus consumes the first two steps in the cycle of operations so that only the first cycle starts with Step 3.

Pressing the "Cycle Start" pushbutton 85 (18) energizes the 1CR relay (18), closing 1CR–1 holding contacts (19) as well as closing 1CR–2 contacts (23). Closing 1CR–2 contacts (23) energizes 3CR relay (25) and 4CR relay (26). Since LS–1 (59) is closed, the closing of 3CR–1 and 4CR–1 (59) due to the energization of their relay coils energizes 9CR relay (59) and 10CR relay (60). Energizing 10CR relay opens 10CR–1 and 10CR–2 contacts (21), preventing the energizing of timers 1T (21, 22) and 2T (23, 24) for reasons that will appear.

The 9CR relay (59) is a sequence relay that is indexed once each time it is energized. It includes normally closed contacts 9CR–1 (62) and normally open contacts 9CR–2 (64). Each time 9CR relay is energized, it indexes once, reversing the relation of switches 9CR–1 and 9CR–2. Let it be assumed that the result of the first index of 9CR produces the condition shown in the drawings, i.e., 9CR–1 contacts closed and 9CR–2 open. Accordingly, 11CR relay (62) is energized and 12CR relay (64) is de-energized. Upon closing of ejector switches 83 (65) and 84 (67), ejector solenoids 69a (65) and 70a (67) of valves 69 and 70 (FIG. 1) as well as timer relays 9T (66) and 10T (68) are energized, causing pistons 67 in the ejector cylinders 66 (FIG. 1) to move downwardly until time delay switches 9T–1 (65) and 10T–1 (67) open, whereupon the pistons 67 return to the top of cylinders 66 and remain there, opening LS–6 (46) and LS–7 (54).

As the ejector pistons 67 move downwardly, LS–6 (46) and LS–7 (54) close, causing solenoids 72a (46) and 73a (54) to be energized through 2CR–2 contacts (46) and 2CR–3 (53) since 2CR relay (20) remains de-energized until accumulator piston 33 moves backward to cause LS–3–1 (20) to close. Energizing solenoids 72a and 73a causes valves 72 and 73 (FIG. 1) to be operated to close the platens 13, 14 of the No. 1 and No. 2 presses.

Energizing of relay 11CR (62) closes 11CR–1 (27) thereby energizing relay 5CR (27) which in turn closes holding contacts 5CR–1 (28). Energizing 11CR (62) and 5CR (27) energizes the solenoid clutch for timer 4T (34, 35) through contacts 11CR–2 (34) and 5CR–2 (35). Energizing solenoid clutch of 4T closes 4T–1 contacts (35) while preset time delay contacts 4T–2 (35) remain closed. Accordingly, motor M for 4T will operate until the predetermined setting of cams to open the 4T–2 contacts (35) and to close the 4T–3 contacts (40) which determines when the air is to be supplied to nozzle 45 for press No. 2.

Energizing relays 3CR (25) and 4CR (26) when button 85 (18) was closed, closes contacts 3CR–2 (43) and 4CR–2 (52.5) which energize the timers 7T (42, 43) and 8T (50, 51). The motors M of these timers are set to time out when the platens 13, 14 for the presses No. 1 and No. 2 close. When the timers 7T and 8T time out, the contacts 7T–3 (44) and 8T–3 (52) close, energizing solenoids 81 (44) and 82 (52), closing valves 41 and 42 (FIG. 1), and energizing 7CR relay (45) and 8CR relay (53), which latter open contacts 7CR–1 (3) and 8CR–1 (4), thereby de-energizing solenoid 36a exhausting the fluid pressure within cylinder 34 (FIG. 2).

With valves 41, 42 closed, the plasticized plastic flows into accumulator 30 forcing piston 33 rearwardly which opens LS–1 (59), dropping out 10CR relay (60). Relay 9CR (59), being a sequence relay, is unaffected by opening of LS–1 since it indexes only upon the closing of LS–1. As the piston 33 goes back, the timer 4T (34, 35) times out so that the 4T–3 contacts (40) close, energizing the 6T solenoid clutch (39) closing 6T–1 (40) contacts while 6T–2 (40) contacts remain closed as do 6T–3 contacts (41). When 4T–3 (40) contacts close, solenoid 48a is energized for a period of preset time until the motor M for 6T timer times out, which may be in a period of about 150 seconds. Energizing 48a solenoid (41) causes valve 48 (FIG. 1) to supply air through nozzle 45 for the nozzle 43 of press No. 2, causing the parison within the dies of the closed platens 13, 14 for that press to be formed into an article.

When the piston 33 retracts to a point where LS–3 (FIG. 2) is actuated to close LS–3–1 (20) and open LS–3–2 (27), relay 2CR (20) is energized, closing holding contacts 2CR–1 (21). Timers 1T (21, 22) and 2T (23, 24) are also energized by the closing of LS–3–1 contacts. Energizing relay 2CR (20) also closes contacts 2CR–4 (47), and since platens 13, 14 for No. 1 press are closed, contacts LS–4–1 (47) are closed. Accordingly, solenoid 72b (47) is energized, thereby opening the platens 13, 14 for press No. 1. Since 11CR relay (62) is still energized, 11CR–3 contacts (54) are closed and the platens 13, 14 for the No. 2 press are held closed.

Opening of platens 13, 14 for No. 1 press actuates LS–4 (FIG. 1), opening LS–4–1 contacts (47) and closing LS–4–2 contacts (65). The former de-energizes solenoid 72b, holding the platens 13, 14 open for press No. 1. The latter energizes solenoid 69a (65), assuming contacts 83 (65) are closed, thereby rendering the ejector piston 67 (FIG. 1) for press No. 1 effective. As previously described, the ejector operates through a cycle, at the end of which contacts 9T–1 (65) open, preventing its operation again. Accordingly, the formed article from the dies 21 of press No. 1 is ejected.

At this time, timer 1T (21, 22) times out, opening contacts 1T–3 (25) de-energizing 3CR relay (25). De-energizing 3CR relay opens contacts 3CR–2 (43) and since 12CR (64) is not energized, contacts 12CR–1 (42) are open and clutch solenoid for 7T (42, 43) as well as solenoid 81 and relay 7CR (45) are de-energized, the de-energizing of solenoid 81 causing opening of gate valve 41 and the de-energizing of the clutch solenoid resetting timer 7T by opening 7T–1 and 7T–3 contacts and closing 7T–2 contacts (43, 44). De-energizing 7CR relay (45) closes 7CR–1 contacts (3), energizing solenoid 36a (3 and FIG. 2), forcing piston 33 forward, thus extruding another parison between the dies 21 of press No. 1.

As the piston 33 reaches its forward position, LS–1 (59) is closed, energizing 10CR relay (60), opening contacts 10CR–1 and 10CR–2 (21), de-energizing 2CR relay (20) and de-energizing clutch coils for timers 1T (21, 22) and 2T (23, 24), the latter causing the timers to reset, closing contacts 1T–3 (25) and 2T–3 (26) thereby energizing 3CR (25) and 4CR (26).

De-energizing 2CR relay (20) closes 2CR–2 contacts (46), energizing solenoid 72a (46), closing the platens 13, 14 for press No. 1. Energizing relay 3CR and relay 4CR closes contacts 3CR–1 and 4CR–1 (59) and since LS–1 (59) is closed, the 9CR sequence relay (59) is energized, causing it to index to its next succeeding position where contacts 9CR–1 (62) open and contacts 9CR–2 (64) close. With 9CR–2 contacts (64) closed, 12CR relay (64) is energized. Since 2CR relay (20) is de-energized, LS–3–1 being open, 2CR–2 contacts (46) and 2CR–3 contacts (63) are closed so that solenoids 72a (46) and 73a (54) are energized (FIG. 1). Platens 13, 14 for both the No. 1 and No. 2 presses are, therefore, closed.

Energizing relay 12CR (64) closes contacts 12CR–2 (29) energizing 6CR relay (29) which closes holding contacts 6CR–1 (30). Energizing 12CR and 6CR relays closes contacts 12CR–3 (31) and 6CR–2 (32), energizing clutch coil for timer 3T (31, 32) which will time when the air goes on for the platens of press No. 1, and when timed out, closes contacts 3T–3 (37), energizing clutch coil for timer 5T (36, 37) which energizes solenoid 47a (38; see also FIG. 1), turning on the air from supply line 46 to the nozzle 45 for the extrusion nozzle 43 of press No. 1.

Energizing 3CR relay (25) closes 3CR–2 contacts (43), energizing the clutch coil of timer 7T (42, 43), which is set to time out, closing contacts 7T–3 (44) when the platens close, thereby energizing solenoid 81, closing gate valve 41 for press No. 1. Since 4CR relay (26) is energized before 11CR relay (62) is dropped out by indexing of relay 9CR (59), 4CR–2 contacts (52.5) hold solenoid 82, energized and, therefore, valve 42 is closed. Accordingly, with both valves 41 and 42 closed, piston 33 moves backwardly toward LS–3–1 and LS–3–2 (20, 27). In the meantime, 12CR relay (64) having been energized closes 12CR–1 contacts (42), energizing clutch coil for timer 7T (42, 43) which effects closing of 7T–3 contacts (44) when valve 42 closes, hence energizing relay 7CR (45), opening 7CR–1 contacts (3), de-energizing solenoid 36a, opening cylinder 34 to exhaust and permitting piston 33 to move backwardly. As piston 33 starts back, it opens LS–1 (59), dropping out 10CR relay (60).

As previously explained, 9CR relay being an indexing sequence relay, it is not now affected.

Again, contacts 12CR-3 (31) being closed since 12CR relay (64) is energized, the clutch coil of timer 3T (31, 32) is energized, and when it times out, 3T-3 contacts (37) close, energizing the clutch coil for timer 5T (36, 37), whereupon solenoid 47a (38) is energized, applying air to nozzle 45 for the extrusion head of the No. 1 press. The setting of timer 5T may be for an extended period of time so that it will remain on beyond the next actuation of LS-3-1 and LS-3-2 contacts (20, 27) and time out before the next succeeding actuation of said LS-3-1, LS-3-2 contacts.

When piston 33 on its rearward travel closes LS-3-1 and opens LS-3-2, 6CR relay (29) momentarily drops out, but since 12CR relay (64) is still energized, 12CR-2 contacts (29) are closed and 6CR relay is re-energized after LS-3-2 is closed upon its release by the next forward movement of piston 33. Closing of LS-3-1 contacts (20) energizes 2CR relay (20) which is tied in by the closing of 2CR-1 contacts (21). This action also energizes the clutch coils for timers 1T (21, 22) and 2T (23, 24). Energizing 2CR relay (20) also closes 2CR-5 contacts (55) and since 11CR-4 (55) and LS-5-1 (55) are closed, the latter since platens for press No. 2 are closed, solenoid 73b is energized, thereby causing the opening of the platens 13, 14 of the No. 2 press. The relay 12CR (64) being still energized, holds solenoid 72a energized, keeping platens 13, 14 of press No. 1 closed.

When the platens for press No. 2 open, LS-5-1 contacts (55) open and LS-5-2 contacts (67) close. Opening LS-5-1 contacts de-energizes solenoid 73b (55) holding the platens for press No. 2 open. Closing LS-5-2 contacts (67) energizes time delay relay 10T and solenoid 70a (67) since contacts 84 (67) have been manually closed. Accordingly, piston 67 for press No. 2 is forced downwardly, ejecting the finished article from between the platens of press No. 2, and contacts 10T-1 (67) open to prevent another immediate ejector operation.

At this time, timer 2T (23, 24) times out, opening 2T-3 contacts (26) thereby de-energizing 4CR relay (26) which latter opens 4CR-2 contacts (52.5), de-energizing solenoid 82 (52) and resetting timer 8T (50, 51). De-energizing solenoid 82 opens gate valve 42, causing a parison to be injected into the open dies 22 of press No. 2. Likewise, opening of 4CR-2 contacts (52.5) de-energizes 8CR relay (53) which closes 8CR-1 contacts (4), energizing the solenoid 36a (3) which will admit pressure fluid to cylinder 34 forcing piston 33 forwardly toward LS-1 switch.

Actuation of LS-1 closes it, re-energizing 10CR relay (60) which opens 10CR-1 and 10CR-2 contacts (21), de-energizing solenoid 2CR (20) and timers 1T and 2T (21-24). The timers 1T and 2T are reset and re-energize 3CR (25) and 4CR relays (26).

Energizing 3CR and 4CR relays closes 3CR-1 and 4CR-1 contacts (59), energizing the sequence relay 9CR (59), causing it to index to its next succeeding position where it closes 9CR-1 contacts (62) and opens 9CR-2 contacts (64). This drops out 12CR relay (64) and re-introduces 11CR relay (62).

When the relay 2CR (20) was last de-energized, 2CR-3 contacts (53) closed, energizing solenoid 73a which closes platens 13, 14 for press No. 2.

When 11CR relay (62) is re-energized, it of course closes 11CR-5 contacts (52), re-energizing solenoid 82 after a predetermined time, closing valve 42 and 8CR relay (53), the latter opening contacts 8CR-1 (4), de-energizing solenoid 36a, exhausting cylinder 34 and permitting piston 33 to move backward.

Should timer 5T not have timed out by the time the present backward movement of piston 33 closes contacts LS-3-1 (20), then the opening of contacts LS-3-2 (27) de-energizes relay 6CR (29) which will drop out timer 3T (31, 32) which in turn will drop out 5T by opening of 3T-3 contacts (37), which latter will also de-energize solenoid 47a (38), shutting off the air from line 46 to nozzle 45 for press No. 1 (FIG. 1).

The first two complete cycles have been specifically described, and they will be repeated so long as the production run is desired to be continued. To graphically represent the automatic cycle, it is shown in the table below:

|  | Press No. 1 | Press No. 2 |
| --- | --- | --- |
| Initial partial cycle: |  |  |
| 3. Ejector energized | Yes | Yes. |
| 4. Platen closed | Yes | Yes. |
| 5. Fluid valve closed | Yes | Yes. |
| 6. Air on | No [1] | Yes. |
| 7. Air off | Yes | No. |
| LS-3 actuated—First complete cycle: |  |  |
| 1. Platen open | Yes | No. |
| 2. Fluid valve open | Yes | No. |
| 3. Ejector energized | Yes | No. |
| 4. Platen closed | Yes | Yes. |
| 5. Fluid valve closed | Yes | Yes. |
| 6. Air on | Yes | Yes. |
| 7. Air off | No | Yes. |
| LS-3 actuated—Second complete cycle: |  |  |
| 1. Platen open | No | Yes. |
| 2. Fluid valve open | No | Yes. |
| 3. Ejector energized | No | Yes. |
| 4. Platen closed | Yes | Yes. |
| 5. Fluid valve closed | Yes | Yes. |
| 6. Air on | Yes | Yes. |
| 7. Air off | Yes | No. |

[1] 1st cycle only.

From the foregoing it is evident that in the automatic sequencing cycle with platens for both presses operating, the first, second, third and seventh steps alternate for each succeeding cycle.

Should the piston 33 continue back beyond LS-3-1 and LS-3-2 contacts, it will actuate a safety limit switch LS-2 (7), thus de-energizing relay MCR (7) which will open MCR-4 contacts (8) thereby de-energizing all of the equipment except the solenoids 72b (47) and 73b (55) which are energized when MCR relay (7) is de-energized since its contacts MCR-2 (8) and MCR-3 (54) close. Energizing solenoids 72b and 73b, of course, opens the platens for both presses No. 1 and No. 2 and when open, LS-4-1 (47) and LS-5-1 (55) open, causing said platens to remain in open position.

The hydraulic pump motor 1M (2) will still be energized and will remain so until a pushbutton 86 (2) is depressed.

Resetting the relay MCR (7) by closing pushbutton 79 (7) will start the operation from the beginning again since the piston 33 has returned to a position closing LS-1 switch (59).

Should an operator open either gate 74 or 75, LS-8-1 (46) and LS-9-1 (54) will open. Accordingly, solenoids 72a and 73a will be de-energized, and the closing of LS-8-2 (51) and LS-9-2 (58) will energize solenoids 72b (47) and 73b (55), respectively, causing the platens for the press or presses in which the gate 74 and/or 75 was opened to open and stay open until contacts LS-8-1 and LS-9-1 have been closed by closing said gates. The cycle will, however, continue but the platens will not close, and the ejector mechanism including pistons 67 will not operate with the gates 74 and/or 75 open.

In order to "jog" the apparatus during "set-up," the "Auto-Jog" switch 77 (18) is actuated to open contacts 77-1 (18) and close contacts 77-2 (49). With power on, pressing pushbutton 87 (46-48) will effect the closing of the platens 13, 14 for press No. 1; pressing pushbutton 88 (54-56) will effect closing of the platens 13, 14 for press No. 2. Pressing pushbutton 89 (46-48) and 90 (54-56) will open the platens for both presses to a point where LS-4 and LS-5 switches are actuated to open LS-4-1 contacts (47) and LS-5-1 contacts (55) to stop the platens in the open position. It is to be noted that the platens cannot be closed unless the ejector pistons 67 are in their upper positions, closing contacts LS-6 (46) and contacts LS–7 (54) and gates 74 and 75 are closed, closing LS–8–1 (46) and LS–9–1 (54).

Should it be desired automatically to operate only the platens on the No. 1 or the No. 2 presses, the selector switch 78 is turned to the dotted line position to the left for press No. 1 and to the right for press No. 2. As previously explained, moving selector switch 78 (32–35; 61–64) to the lefthand dotted line position opens contacts 78–1, 78–3 and 78–4; closes contacts 78–2 (32–35); and closes contacts 78–5; and opens contacts 78–6, 78–7 and 78–8 (61–64). This will lock out timer 4T (34, 35) since contacts 78–3 and 78–4 (34, 35) are open; and will lock out relay 12CR (64) since contacts 78–7 and 78–8 (63, 64) are open. Relay 11CR (62) will be locked in because contacts 78–5 (61) are now closed and accordingly, only the platens 13, 14 for press No. 1 will operate. Since 11CR relay (62) is now locked in permanently through contacts 78–5 (61), 11CR–3 contacts (54) are closed, maintaining solenoid 73a energized and platens 13, 14 of press No. 2 closed. The locking out of timer 4T (34, 35) maintains contacts 4T–3 (40) open, preventing the energizing of solenoid 48a and consequently the timing on of air for the nozzle 45 of press No. 2. Furthermore, 11CR–5 contacts (52) are permanently closed, energizing solenoid 82 (52) maintaining gate valve 42 closed. This will cut the cycle time for the operation of platens for press No. 1 in half since the platens will open each time LS–1 (59) is closed instead of every other time.

If it is desired to operate the platens for the No. 2 press only, the switch 78 (32–35; 61–64) is turned to the righthand dotted line position. This will open contacts 78–1, 78–2, 78–4, 78–5, 78–6 and 78–8, and will close contacts 78–3 and 78–7 (32–35; 61–64). This will lock out timer 3T (31–32) and relay 11CR (62), locking in relay 12CR (54). Consequently only the platens for press No. 2 will operate. The platens for press No. 1 will remain closed, the air will be off and the valve 41 will be closed, as previously described relative to the use of only the platens for press No. 1. This will also cut the cycle time for the platens of press No. 2 in half since its platens will open each time switch LS–1 (59) is closed.

In order to maintain in dies 21, 22 of the No. 1 and No. 2 presses at a satisfactory temperature, coolant may be circulated therethrough. The coolant may be supplied from a coolant motor having a starting coil 3M (5) that may be energized by closing button 91 (5) and held in by contacts 3M–1 (6). The motor coil 3M may be de-energized by pushing button 92 (5).

Although the various features of the new and improved system and control therefor have been described in detail to fully disclose one embodiment of the invention, it will be evident that changes may be made in such details and certain features may be used without others without departing from the principles of the invention

What is claimed is:

1. In a blow molding system, identical presses mounted in opposed aligned relation, each of said presses having separate sets of reciprocable platens; separate single piston and cylinder means only at the far ends of said presses and connected to their corresponding platens, said connecting means being such that equal movements in opposite directions of said piston and cylinder means produce equal and opposite movements of the corresponding platens; extruder means; separate manifold means for each of said presses connected to the outlet of said extruder means; extrusion head means for each of said separate sets of platens connected to said separate manifold means and arranged to extrude plastic parisons between said platens when said platens are open; valve means for each of said manifold means; accumulator means connected to the outlet of said extruder means, whereby said extruder means continues to run when both of said valve means are closed, and the output therefrom is received by said accumulator means; means responsive to the filling of said accumulator means for opening said platens; and cycle operating means for controlling the operation of said platens and valve means for effecting the production of plastic articles alternately by said separate presses.

2. In a blow molding system, identical presses mounted in opposed aligned relation, each of said presses having separate sets of reciprocable platens; separate single piston and cylinder means only at the far ends of said presses and connected to their corresponding platens, said connecting means being such that equal movements in opposite directions of said piston and cylinder means produce equal and opposite movements of the corresponding platens; extruder means; separate manifold means for each of said presses connected to the outlet of said extruder means; extrusion head means for each of said separate sets of platens connected to said separate manifold means and arranged to extrude plastic parisons between said platens when said platens are open; valve means for each of said manifold means; separate ejector means for each of said sets of platens; accumulator means connected to the outlet of said extruder means, whereby said extruder means continues to run when both of said valve means are closed, and the output therefrom is received by said accumulator means; means responsive to the filling of said accumulator means for opening said platens; and cycle operating means for controlling the operation of said platens, valve means and said ejector means for effecting the production of plastic articles alternately by said separate presses.

3. In a blow molding system, identical presses mounted in opposed aligned relation, each of said presses having separate sets of reciprocable platens; separate single piston and cylinder means only at the far ends of said presses and connected to their corresponding platens, said connecting means being such that equal movements in opposite directions of said piston and cylinder means produce equal and opposite movements of the corresponding platens; extruder means; separate manifold means for each of said presses connected to the outlet of said extruder means; extrusion head means for each of said separate sets of platens connected to said separate manifold means and arranged to extrude plastic parisons between said platens when said platens are open; valve means for reach of said manifold means; separate ejector means for each of said sets of platens; air jet nozzle means for each of said extrusion head means; accumulator means connected to the outlet of said extruder means, whereby said extruder means continues to run when both of said valve means are closed, and the output therefrom is received by said accumulator means; means responsive to the filling of said accumulator means for opening said platens; and cycle operating means for controlling the operation of said platens, valve means, ejector means and said air jet nozzle means for effecting the production of plastic articles alternately by said separate presses.

4. In a blow molding system, first and second presses having reciprocable platens thereon and aranged in opposed aligned relation; means for separately opening and closing the platens of both said presses; extrusion head means in cooperative position relative to the reciprocable platens for each of said presses; extruder means for supplying plasticized plastic to both of said extrusion head means; valves for controlling the flow of said plasticized plastic to said extrusion head means; accumulator means between said extruder means and said extrusion head means; air jet means for each of said extrusion head means; ejector means for the platens of each of said presses; means for producing a cycle of operations including means for opening the platens of said first press while closing the platens of said second press in response to the filling of said accumulator means; means for opening the valve for the first press extrusion head means while closing the valve means for the second press extrusion head means; means for operating the ejector means of the first press without operating the ejector means for the second press; means for closing the platens of the first press while retaining the platens of the second press closed; means for closing the valve for the extrusion head means for the first press while retaining the valve closed for the extrusion head means of the second press, whereby said plasticized plastic fills said accumulator means; means for turning on the air jet means for the extrusion head means for both presses; means for turning off the air jet means for the first press while leaving the air jet means for the second press on; and means for repeating said cycle of operations with a reversal of the first, second, third and last operations within said cycle.

5. In a blow molding system, first and second presses having reciprocable platens thereon and arranged in opposed aligned relation; means for separately opening and closing the platens of both said presses; extrusion head means in cooperative position relative to the reciprocable platens for each of said presses; extruder means for supplying plasticized plastic to both of said extrusion head means; valves for controlling the flow of said plasticized plastic to said extrusion head means; accumulator means between said extruder means and said extrusion head means; air jet means for each of said extrusion head means; ejector means for the platens of each of said presses; means for producing a cycle of operations including means for opening the platens of said first press while closing the platens of said second press in response to the filling of said accumulator means; means for opening the valve for the first press extrusion head means while closing the valve means for the second press extrusion head means; means for operating the ejector means of the first press without operating the ejector means for the second press; means for closing the platens of the first press while retaining the platens of the second press closed; means for closing the valve for the extrusion head means for the first press while retaining the valve closed for the extrusion head means of the second press, whereby said plasticized plastic fills said accumulator means; and means for repeating said cycle of operations with a reversal of the first, second and third operations within said cycle.

6. In a blow molding system, a press having reciprocable platens thereon; means for opening and closing said platens; extrusion head means in cooperative position relative to said reciprocable platens; extruder means for supplying plasticized plastic to said extrusion head means; a valve for controlling the flow of said plasticized plastic to said injection-head means; accumulator means between said extruder means and said extrusion head means; air jet means for said extrusion head means; ejector means associated with said platens; means for producing a cycle of operations including means for opening said platens in response to the filling of said accumulator means; means for opening said valve; means for rendering effective said ejector means; means for closing said platens; means for closing said valve, whereby said plasticized plastic fills said accumulator means; means for turning on said air jet means; means for retaining said air jet means on; and means for repeating said cycle of operations with a reversal of the first, second, third and last operations within said cycle.

References Cited by the Examiner
UNITED STATES PATENTS

| | | | |
|---|---|---|---|
| 2,632,202 | 3/1953 | Haines | 18—5 |
| 2,653,348 | 9/1953 | Elgin et al. | 18—12 |
| 2,688,770 | 9/1954 | Henning | 18—12 |
| 2,724,860 | 11/1955 | Strong | 18—5 |
| 2,804,648 | 9/1957 | Strauss | 18—30 |
| 2,854,691 | 10/1958 | Strong | 18—5 |
| 2,871,516 | 2/1959 | Sherman et al. | 18—30 |
| 2,881,477 | 4/1959 | Triulzi | 18—30 |
| 2,887,716 | 5/1959 | Crosio | 18—30 XR |
| 2,980,955 | 4/1961 | Sanko | 8—5 |
| 3,044,112 | 7/1962 | Perry | 18—5 |
| 3,063,092 | 11/1962 | Fischer | 18—5 |
| 3,068,511 | 12/1962 | Ahlbeck et al. | 18—5 |
| 3,069,722 | 12/1962 | Kato | 18—5 |
| 3,078,508 | 2/1963 | Martin | 18—5 |
| 3,103,701 | 9/1963 | Calchera et al. | 18—16 |
| 3,127,637 | 4/1964 | Rex | 18—5 XR |

J. SPENCER OVERHOLSER, *Primary Examiner.*

MICHAEL V. BRINDISI, *Examiner.*